United States Patent Office 3,297,620
Patented Jan. 10, 1967

3,297,620
EMULSION LATEX CONTAINING PARTIAL AMIDE OF STYRENE-MALEIC ANHYDRIDE COPOLYMER AS EMULSIFIER
George J. Anderson, Wilbraham, and Charles R. Williams, Longmeadow, Mass., assignors to Monsanto Company, St. Louis, Mo., a corporation of Delaware
No Drawing. Filed July 20, 1964, Ser. No. 383,916
12 Claims. (Cl. 260—29.6)

This invention is directed to novel emulsion polymerized latex and more particularly to an emulsion polymerized latex containing a particular emulsifier and to a process for preparing the latex.

As practiced today, emulsion polymerized latexes are prepared by employing surface active compounds as emulsifying agents. These materials or compounds include such surface active agents as ethylene-oxide condensates of nonylphenol or salts of alkyl aryl sulfonates. These emulsifiers are well known in the art and are used very extensively. However, such systems have certain drawbacks in that the use of these surface active agents cause films of the latex to be unusually water sensitive. This affects the quality and durability of the film. Therefore, it would be desirable to have a material which can be used as an emulsifier for emulsion polymerized latexes but yet would not be a surface active agent.

Therefore, it is an object of this invention to provide a novel emulsion polymerized latex containing a particular emulsifier.

Another object of this invention is to provide an improved process for preparing the novel emulsion polymerized latex.

It has now been surprisingly discovered that by employing a particular polymer as the sole emulsifier for preparing emulsion polymerized latexes, the latexes so prepared are of uniform texture and are free of surface active agents. Because the latex is free of surface active agents, films of the latex have greater resistance. The particular polymer employed or used as the sole emulsifier is a salt of a partial amide of a copolymer of maleic anhydride and a vinylidene aromatic compound.

The following examples are set forth to illustrate more clearly the principle and practice of this invention to those skilled in the art and unless otherwise noted where parts or quantities are mentioned they are parts or quantities by weight.

Example I

To a stirred reaction vessel equipped with a dropping funnel, the following emulsifier system is charged to the reaction vessel under agitation:

| | Parts |
|---|---|
| Water | 55.4 |
| n-Propyl amide of styrene maleic anhydride copolymer | 7.1 |
| Ammonium hydroxide (27% solution) | 4.6 |

To the reaction vessel is then added an initiator system consisting of:

| | Part |
|---|---|
| Ammonium persulfate | 0.35 |
| Sodium bisulfite | 0.18 |
| Water | 6.00 |

Simultaneously, the initiator and 28.6 parts of a styrene monomer are added to the reaction vessel over a period of time of about 180 minutes under constant agitation. During this period of time, the reaction temperature is maintained at about 60° C. At the end of the addition of the initiator and the styrene monomer, the reaction is continued for an additional 30 minutes to insure polymerization of trace amounts of the styrene monomer.

The resulting latex is cooled to room temperature and is an emulsion polymerized latex of uniform texture and free of surface active agents.

Example II

Example I is repeated except that in place of the styrene monomer, a methyl methacrylate monomer is employed herein. The reaction is carried out at a temperature of 95° C. instead of the 60° C. employed in Example I.

The results obtained are the same as Example I.

Example III

Example I is repeated except that in place of the 7.1 parts of the n-propyl amide of the styrene maleic anhydride copolymer, 14 parts are employed herein, and in place of the 28.6 parts of the styrene monomer, 21.7 parts are employed herein.

The results obtained are the same as in Example I.

Example IV

Example I is repeated except that in place of the n-propyl amide of the styrene maleic anhydride copolymer, the cyclohexyl amide of the styrene maleic anhydride copolymer is used herein.

The resulting latex so obtained is the same as in Example I.

Example V

Example I is repeated except that in place of the n-propyl amide of the styrene maleic anhydride copolymer the butyl amide of the styrene maleic anhydride copolymer is employed herein.

The results obtained are the same as in Example I.

This invention is directed to an emulsion polymerized latex containing as the sole emulsifier a particular polymer and to a process for preparing the emulsion polymerized latex. The emulsion polymerized latex of this invention employs as the sole emulsifier 10–40 weight percent of a polymer based on the total weight of emulsion solids thereof, wherein the polymer has a molecular weight of 1000–20,000 and is a salt of a partial amide of a copolymer of maleic anhydride and a vinylidene aromatic compound and which polymer has in its structure recurring groups of the formulae:

$$\left[ \begin{array}{c} R\diagdown \diagup R' \phantom{XX} X \\ N \phantom{XXXXX} | \\ | \phantom{XXXXXX} O \\ R'' \phantom{X} O=C \phantom{X} C=O \\ | \phantom{XXX} | \phantom{XXX} | \\ -CH_2-C-\!\!-\!\!-\!\!-CH-\!\!-\!\!-CH- \\ | \\ Ar \end{array} \right] \quad \text{I}$$

and $$\left[ \begin{array}{c} X \phantom{XX} X \\ | \phantom{XXX} | \\ O \phantom{XX} O \\ R'' \phantom{X} O=C \phantom{X} C=O \\ | \phantom{XXX} | \phantom{XXX} | \\ -CH_2-C-\!\!-\!\!-\!\!-CH-CH- \\ | \\ Ar \end{array} \right] \quad \text{II}$$

with the groups of Formula I constituting 20–100% of the total of the groups of Formulae I and II and wherein R and R' are independently selected from the group consisting of hydrogen and any organic radical of 1–20 carbon atoms, R'' is selected from the group consisting of hydrogen, an alkyl radical of 1–5 carbon atoms, a halogen and a nitrile, and mixtures thereof, and wherein Ar is an aromatic radical of 1–2 benzene rings and wherein X is selected from the group consisting of ammonium, substituted ammonium and alkali metal ions. Any of the substituted ammonium ions can be employed in the practice of this invention but those that are particularly useful are the ions formed from such compounds as mono-, di- and tri-methyl amines, mono-, di- and tri-ethyl amines, mono-, di- and tri-isopropyl amines, mono-, di- and tri-ethanol amines, 2-methyl-2-amino-propanol-1, and mixtures thereof. The alkali metal ions employed herein are lithium, sodium, potassium, etc. More particularly in the practice of this invention, the number of groups of Formula I constitutes 30–70% of the total of the groups of Formulae I and II. In the preferred embodiment of this invention, R in the above formula is an organic radical of 3–6 carbon atoms, R' and R'' are hydrogen, X is ammonium and Ar is a single benzene ring.

There are several critical features of the instant invention. First, the amounts of emulsifier of this invention must be within the range of 10–40 weight percent based on the total weight of the emulsion solids. If too little is used, the latex will coagulate producing a totally unsatisfactory system. If an excess of 40 weight percent, little or no increase in benefit is readily obtained. Second, the amide of the copolymer employed includes the partial amide and up to and including the half amide thereof. The full amide cannot be used. If the straight salt of the polymer is used and not the partial amide thereof, gelling of the latex will occur which, of course, renders the latex completely unsatisfactory. Third, the molecular weight of the sole emulsifier of this invention must be within the range specified; namely, a low molecular weight type material of 1000–20,000 molecular weight. If the molecular weight of the emulsifier is too high, the latex will become too thick and gelation can occur. Therefore, the molecular weight is also a critical feature of this invention.

As stated previously the emulsifier of this invention is the salt of a partial amide of a copolymer of maleic anhydride and a vinylidene aromatic compound. The amide portion of the emulsifier has the formula:

wherein R and R' are independently selected from the group consisting of hydrogen and any organic radical of 1–20 carbon atoms. The organic radical of 1–20 carbon atoms consists of hydrogen and carbon with or without oxygen, nitrogen and other elements. Preferably, it is selected from the group consisting of alkyl, aryl, alkaryl, aralkyl and cycloalkyl radicals. The emulsifier of this invention is prepared by reacting an amine or a substituted amine with the vinylidene aromatic compound. The substituted amines that are particularly useful in preparing the emulsifier of this invention and which may be employed in place of those amines used in the examples to prepare the emulsifier of this invention are butyl amine, octyl amine, octadecyl amine, aniline, alpha-naphthyl amine, anthra-amine, benzyl amine, xylyl amine (tolubenzyl amine), toluidine, t-nonylphenol amine, cyclo hexyl amine, cyclo pentyl amine, diethyl amine, dibutyl amine, dioctyl amine, dibenzyl amine, dicyclo hexyl amine, methyl ethyl amine, methyl n-propyl amine, methyl octyl amine, methyl benzyl amine, methyl cyclopentyl amine, and mixtures thereof. The preferred substituted amine to be employed in preparing the partial amide of the particular emulsifier of this invention is the butyl amine.

In the practice of this invention any emulsion polymerized latex, prepared at a pH of 7 or above, can be employed herein using as the sole emulsifier a salt of a partial amide of a copolymer of maleic anhydride and a vinylidene aromatic compound. The emulsion polymerized latex employed herein can be any of the vinylidene monomers such as mono- and di-olefins, e.g., ethylene, propylene, isobutylene, butadiene, isoprene, etc.; vinyl halides, e.g., vinyl chloride, vinyl bromide, etc; vinylidene halides, e.g., vinylidene chloride; esters of vinylidene monocarboxylic acids with 1–18 carbon atom monohydric alcohols, e.g., methyl acrylate, methyl alpha-chloroacrylate, butyl acrylate, benzyl acrylate, dodecyl acrylate, the corresponding esters of methacrylic acid, etc.; amides and nitriles of vinylidene monocarboxylic acids, e.g., methacrylamide, acrylonitrile, methacrylonitrile, etc.; vinylidene aromatic hydrocarbons and nuclear alkyl and halogen derivatives thereof, e.g., styrene, vinyl naphthalene, alpha-methylstyrene, vinyl toluene, vinyl xylene, 2,4-dimethylstyrene, o-, m-, p-chlorostyrene, 2,5-dichlorostyrene, 2-methyl-4-chlorostyrene, etc.; vinyl alkyl ethers, e.g., vinyl methyl ether, vinyl isobutyl ether, etc.; vinylidene heterocyclic compounds such as vinyl pyridine, etc.; vinyl esters of 1–18 carbon monocarboxylic acids such as vinyl acetate, vinyl stearate, and vinyl benzoate, etc. Diesters of maleic acid and fumaric acid with 1–18 carbon atom monohydric alcohols, while not vinylidene monomers in the strict sense of the word, can be used interchangeably therewith. Typical examples of such monomers are diethyl maleate, dibutyl fumarate, etc. In the practice of this invention, homopolymers and interpolymers of the above can be employed to prepare the emulsion polymerized latex of this invention. Preferably, the interpolymer employed consists of interpolymers of styrene containing at least 40 weight percent of styrene with the balance being at least one other monomeric compound which is interpolymerizable therewith.

In place of those emulsion polymerized latexes prepared in the examples, the following latexes can also be prepared using the emulsifiers of this invention:

(a) Methyl acrylate,
(b) Butyl acrylate,
(c) Styrene/acrylonitrile/2-ethylhexyl acrylate,
(d) Styrene/acrylonitrile/dibutyl fumarate,
(e) Styrene/butadiene,
(f) Styrene/ethyl acrylate,
(g) Methyl methacrylate/acrylonitrile/2-ethylhexyl acrylate,
(h) Butadiene/acrylonitrile,
(i) Butadiene/methacrylate,
(j) Vinyl chloride/vinyl acetate,
(k) Vinyl chloride/ethyl acrylate, and
(l) Vinyl chloride/dibutyl fumarate.

In addition, the instant invention is directed to an improved process of preparing an emulsion polymerized latex. The process conditions are generally those that are conventionally used in preparing any of the emulsion polymerized latexes which can be prepared at a pH of 7 or above. The essential feature of the process employed herein is that the particular polymer emulsifier is used in the process. In addition, certain temperatures of reaction are used and these are generally up to 100° C. When preparing an emulsion polymerized styrene homopolymer or interpolymer, for example, the reaction temperature is maintained at up to about 65° C. If a reaction temperature in excess of 65° C. is used in preparing the emulsion polymerized latex styrene homopolymer, coagulation may result which will produce a totally unsatisfactory latex. When preparing other latexes, generally higher temperatures of reaction are employed.

It will thus be seen that the objects set forth above among those made apparent from the description are efficiently attained and since changes may be made in carrying out the above process and in the compositions set forth without departing from the scope of this invention, it is intended that all matters contained from the above description shall be interpreted as illustrative and not in a limiting sense.

What is claimed is:

1. An emulsion polymerized latex containing as the sole emulsifier 10–40 weight percent of a polymer based on the total weight of emulsion solids thereof, wherein the polymer has a molecular weight of 1000–20,000 and is a salt of a partial amide of a copolymer of maleic anhydride and a vinylidene aromatic compound and which polymer has in its structure recurring groups of the formulae:

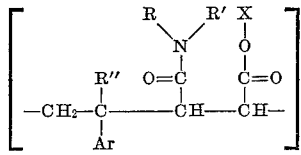  I and

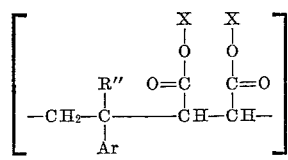  II with the groups of Formula I constituting 20–100% of the total of the groups of Formulae I and II and wherein R and R' are independently selected from the group consisting of hydrogen and an organic radical of 1–20 carbon atoms, R" is selected from the group consisting of hydrogen, an alkyl radical of 1–5 carbon atoms, a halogen and a nitrile, and mixtures thereof, Ar is an aromatic radical of 1–2 benzene rings, and X is selected from the group consisting of ammonium, substituted ammonium and alkali metal ions.

2. The composition of claim 1 wherein the emulsifier is the salt of a partial amide of styrene maleic anhydride.

3. The composition of claim 1 wherein the emulsifier is the ammonium salt of the butyl amide of a styrene maleic anhydride copolymer.

4. The composition of claim 1 wherein the emulsion polymerized latex is a styrene homopolymer.

5. The composition of claim 1 wherein the emulsion polymerized latex is a styrene interpolymer of at least 40 weight percent of styrene with the balance thereof being at least one other vinylidene monomer which is interpolymerizable therewith.

6. The composition of claim 5 wherein the styrene interpolymer is a styrene methyl acrylate copolymer.

7. In an emulsion polymerization process for preparing an emulsion polymerized latex by polymerizing the reactants at a temperature of up to about 100° C. in the presence of an emulsifier, the improvements consisting of employing as the sole emulsifier 10–40 weight percent of a polymer based on the total weight of the emulsion solids thereof, wherein the polymer has a molecular weight of 1000–20,000 and is a salt of a partial amide of a copolymer of maleic anhydride and a vinylidene aromatic compound and which polymer has in its structure recurring groups of the formulae:

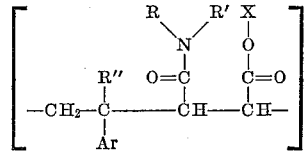  I and

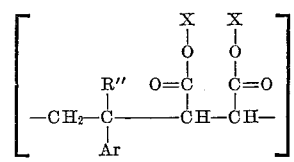  II with the groups of Formula I constituting 20–100% of the total of the groups of Formulae I and II and wherein R and R' are independently selected from the group consisting of hydrogen and an organic radical of 1–20 carbon atoms, R" is selected from the group consisting of hydrogen, an alkyl radical of 1–5 carbon atoms, a halogen and a nitrile, and mixtures thereof, Ar is an aromatic radical of 1–2 benzene rings, and X is selected from the group consisting of ammonium, substituted ammonium and alkali metal ions.

8. The process of claim 7 wherein the emulsion polymerized latex is a styrene homopolymer.

9. The process of claim 7 wherein the emulsion polymerized latex is a styrene interpolymer and the temperature to which the reactants are heated is up to 65° C.; said styrene interpolymer being at least 40 weight percent of styrene with the balance thereof being at least one other vinylidene monomer which is interpolymerizable therewith.

10. The process of claim 7 wherein the emulsifier is the salt of a partial amide of a styrene maleic anhydride copolymer.

11. The process of claim 7 wherein the salt of the partial amide of a copolymer of maleic anhydride and a vinylidene aromatic compound is the ammonium salt thereof.

12. The process of claim 7 wherein the salt is the ammonium salt of the butyl amide of a styrene maleic anhydride copolymer.

References Cited by the Examiner
UNITED STATES PATENTS

| | | | |
|---|---|---|---|
| 2,798,062 | 7/1957 | Contois | 260—29.6 |
| 2,977,334 | 3/1961 | Zopf et al. | 260—78.5 |

MURRAY TILLMAN, *Primary Examiner.*

W. J. BRIGGS, SR., *Assistant Examiner.*